United States Patent [19]

Hayakawa et al.

[11] Patent Number: 5,533,880
[45] Date of Patent: Jul. 9, 1996

[54] MOLDING APPARATUS HAVING A MOVABLE DIE AND A COUNTER ROLL

[75] Inventors: Yuzo Hayakawa, Takarazuka; Tsuneo Hirai, Tsuzuki-gun; Tsutao Katayama, Takatsuki, all of Japan

[73] Assignee: Takeda Chemical Industries, Ltd., Osaka, Japan

[21] Appl. No.: 271,053

[22] Filed: Jul. 8, 1994

Related U.S. Application Data

[62] Division of Ser. No. 849,662, Mar. 10, 1992, Pat. No. 5,352,110.

[30] Foreign Application Priority Data

Mar. 12, 1991 [JP] Japan ................................ 3-047020

[51] Int. Cl.$^6$ .............................. B29C 70/14; B30B 3/00
[52] U.S. Cl. ........................ 425/328; 100/156; 100/210; 425/367; 425/373
[58] Field of Search .................... 264/108, 210.2, 264/257, 280, 137, 175, 174, 285, 294; 425/373, 335, 367, 328; 100/156, 168, 210

[56] References Cited

U.S. PATENT DOCUMENTS

| 736,217 | 8/1903 | Clark | 100/156 |
|---|---|---|---|
| 2,620,513 | 12/1952 | Cryor et al. | 425/335 |
| 2,674,764 | 4/1954 | Eaby et al. | 425/294 |
| 2,779,388 | 1/1957 | Quoss | 425/335 |
| 2,852,806 | 9/1958 | Erdelyi | 425/328 |
| 3,299,837 | 1/1967 | Lind | 425/335 |
| 3,448,489 | 6/1969 | Boggs | 425/335 |
| 3,469,609 | 9/1969 | Putzig | 425/335 |
| 3,571,849 | 3/1971 | Kirk | 100/156 |
| 3,583,030 | 6/1971 | Terry et al. | 425/328 |
| 3,679,790 | 7/1972 | Alfsen | 264/280 |
| 3,850,558 | 11/1974 | Payraudeau | 425/373 |
| 4,033,709 | 7/1977 | Kroyer | 425/335 |
| 4,238,178 | 12/1980 | Bailey | 425/367 |
| 4,289,471 | 9/1981 | Dunbar et al. | 425/373 |
| 4,421,776 | 12/1983 | Brinkers et al. | 425/373 |
| 4,474,845 | 10/1984 | Hagerman et al. | 264/175 |
| 4,777,005 | 10/1988 | Miller | 264/285 |
| 4,789,514 | 12/1988 | Lo | 264/280 |
| 4,818,460 | 4/1989 | Nied | 264/310 |
| 4,880,375 | 11/1989 | Hayashi | 425/335 |
| 4,927,581 | 5/1990 | Medwin | 264/257 |
| 4,938,905 | 7/1990 | Daimaru | 264/108 |
| 5,041,178 | 8/1991 | Kielmeyer et al. | 264/108 |
| 5,102,609 | 4/1992 | Miller et al. | 264/285 |
| 5,164,201 | 11/1992 | Hayashi | 425/373 |

FOREIGN PATENT DOCUMENTS

| 1455038 | 10/1966 | France . | |
| 1504491 | 10/1965 | Germany . | |
| 56-161126 | 12/1981 | Japan | 264/108 |
| 7317698 | 7/1975 | Netherlands | 425/373 |
| 759092 | 10/1956 | United Kingdom . | |

*Primary Examiner*—Robert Davis
*Attorney, Agent, or Firm*—Wenderoth, Lind & Ponack

[57] ABSTRACT

A molding device for compacting a fiber reinforced resinous material to form an article of manufacture in which reinforcement fibers contained in the fiber reinforced resinous material are oriented as desired. The device includes a die; a roll opposed to the die; a compressing mechanism for pressing one of the die and the roll against the other of the die and the roll; and driving a mechanism for reciprocating and/or rotating one of the die and the roll relative to the resinous material. In this construction, the fiber reinforced resinous material is shaped into a predetermined configuration by compressing a number of times the fiber reinforced resinous material delivered by the pressing mechanism until the fiber reinforced resinous material is compacted to a predetermined degree of compression. After the fiber reinforced resinous material has been compacted, the fiber reinforced resinous material is delivered by the drive mechanism in a direction outwardly of the molding device with no need to apply any drawing force, to thereby continuously shape the fiber reinforced resinous material to provide shaped articles.

4 Claims, 11 Drawing Sheets

Fig.25 (A)
Fig.25 (B)
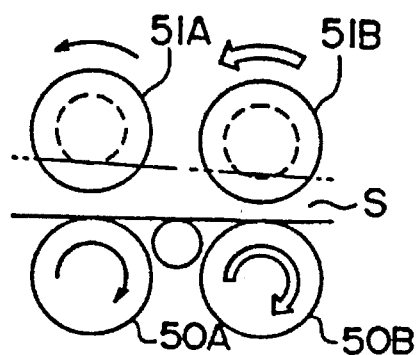
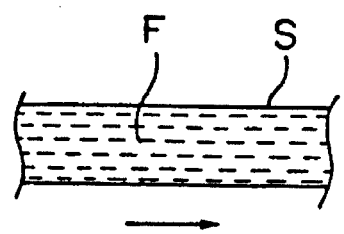
Fig.26 (A)
Fig.26 (B)
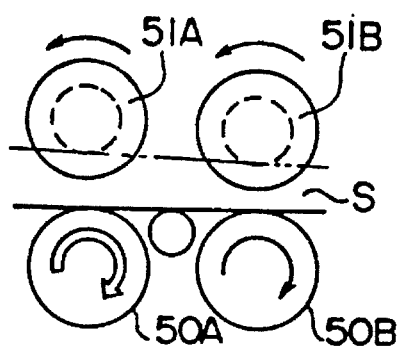
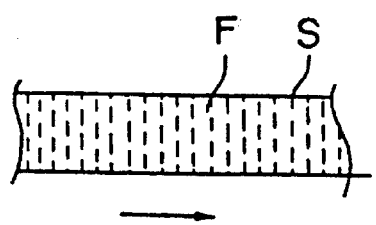
Fig.27
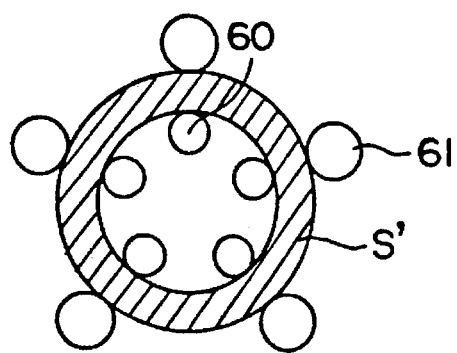

MOLDING APPARATUS HAVING A MOVABLE DIE AND A COUNTER ROLL

This is a divisional application of Ser. No. 07/846,662, filed Mar. 10, 1992, now U.S. Pat. No. 5,352,110.

BACKGROUND OF THE INVENTION

1. Field of the Invention

The present invention generally relates to a method of and a device for molding and shaping fiber reinforced resinous material and, more particularly, to a method of and the device for molding and shaping a semi-cured molding material (either sheet molding compound or thick molding compound) comprising unsaturated polyester resin or epoxy resin mixed with a high temperature curing agent and reinforcement fibers such as, for example, glass fibers impregnated with the resin to provide a shaped article of manufacture of any desired shape wherein the reinforcement fibers are oriented in any desired direction.

2. Description of the Prior Art

Conventionally, there are two methods for molding a compound consisting of reinforcement fibers such as glass fibers or carbon fibers, resin, and a curing agent into a required configuration. According to one of those methods, the reinforcement fibers, resin, and the curing agent are mixed with each other during the molding operation. That is, a wet material is used in this method. According to the other method, a prepreg sheet, for example, a fiber reinforced forced resin such as a sheet molding compound (SMC) or a thick molding compound (TMC) consisting of the above described semi-cured reinforcement fibers, resin and the curing agent is used to mold the material by use of a press. That is, a dry material is used in this method.

The conventional molding method utilizing the dry material such as the sheet molding compound is superior and widely used because it does not cause environmental pollution unlike the method using the wet material; the sheet molding compound can be treated easily during the molding operation; and the surface of the resultant product is glossy. The material can be molded into produc having complicated shapes with highly accurate dimensions.

The dry molding of the compound such as the fiber reinforced resinous material is carried with a thermal compressive molding method in which a press and a mold are generally utilized. By way of example, after the compound cut to a predetermined shape covering an inner mold surface has been inserted into the lower mold, an upper mold is pressed under a high pressure against the lower mold so that, within the cavity defined between the upper and lower molds, the compound can be shaped. At the same time, this press molding is carried out at a high temperature and, during this press molding, a compound is also cured simultaneously.

However, according to the conventional press molding method, the high pressure of 1.2MPa is applied to the composite material all at one time. Therefore, the composite material fluidizes abruptly with the consequence that the reinforcement fibers in the composite material are biased in an unexpected direction, making it impossible to control the orientation of the reinforcement fibers.

In the composite material generally used in the practice of the press molding method, the reinforcement fibers contained therein are not oriented in a particular direction and are substantially uniformly oriented in all direction. Therefore, the composite material is prepared having an isotropy in which the strength relative to any direction is uniform. However, as hereinbefore discussed, there is a problem in that during the press molding, the reinforcement fibers are oriented in an unexpected direction. Accordingly, for example, where the molded article is required to have an isotropic strength, the strength may vary depending on the direction making it impossible for the resultant article to satisfy the requirements. On the other hand, where the molded article is required to have a so-called anisotropic strength in which the strength in one particular direction is higher than that in any other direction, it is difficult to control the reinforcement fibers to be oriented in the particular direction, thereby failing to satisfy the intended requirements.

Also, when the composite material is to be molded into a predetermined shape under the high pressure applied all at one time by the press, the flow of the material varies from one place to another within the molding cavity of the press. Therefore, peeling, laminar separation, and interlayer undulation tend to occur and, at the same time, the raw material will not be uniformly distributed, resulting in a defect in the eventually shaped products. Where the fiber reinforced resinous material such as the sheet molding compound is to be press-molded, a limitation in the mold design makes it difficult to mold the article in a generally elongated configuration.

Thus, in order to mold the fiber reinforced resinous material continually, the method utilizing the wet material has been widely used wherein, after the continuous reinforcement fibers have been impregnated with a resinous material, the reinforcement fibers are pulled from the cavity of the die by the application of a relatively great pulling force.

However, where the articles are to be continuously manufactured using the wet material as described above, the application of the relatively great pulling force results in an increased power consumption. In addition, the expensive continuous reinforcement fibers results in an increased manufacturing cost. While the plural reinforcement fibers are pulled into a bundle, the reinforcement fibers tend to be randomly aligned and cause deterioration the physical properties of the molded parts. Furthermore, it is difficult to mold the article of relatively large size and complicated shape.

SUMMARY OF THE INVENTION

The present invention has been devised to substantially eliminate the foregoing problems inherent in the prior art methods and apparatuses and is intended to provide an improved method and an improved device, wherein in the practice of a molding method utilizing a dry material comprising a fiber reinforced resinous material such as, for example, a sheet molding compound. Based on this invention, the orientation of the reinforcement fibers can be controlled during the molding operation so that one of anisotropic and isotropic strengths can be selected and, at the same time, a continuous molding with the use of the dry material is possible.

According to the present invention, processing is carried out in small steps in a superimposed fashion so that the fiber reinforced resinous material can be stepwisely compressed at different stages to thereby to achieve a controlled orientation of the reinforcement fibers, which has hitherto been difficult in the press-molding operation, while eliminating any possible uneven fluidization.

In order to accomplish the foregoing objective, the present invention provides a method of molding a fiber reinforced resinous material which comprises the steps of positioning the semi-cured fiber reinforced resinous material formed by impregnating reinforcement fibers with resin between a die and a roll opposed to each other; relatively moving the fiber reinforced resinous material; compressing the fiber reinforced resinous material a number of times with the roll and/or the die until the fiber reinforced resinous material is compacted to a predetermined final degree of compression; and orienting the reinforcement fibers in a predetermined direction and shaping the fiber reinforced resinous material into a predetermined configuration complemental to the configuration of the die by compressing the fiber reinforced resinous material.

The die disposed in opposition to the roll referred to above may be either a flat mold or a generally cylindrical mold and, where the flat mold is employed, the roll may be supported for reciprocating motion over the flat die. Alternatively, where the cylindrical mold is employed, both the roll and the cylindrical mold may be supported for rotation about their axes of rotation.

Also, where the cylindrical mold is employed, the cylindrical mold may or may not have its outer peripheral surface formed with indentations. The cylindrical mold may have an outer peripheral surface of a shape substantially identical with the shape of the outer peripheral surface of the roll where the article desired to be manufactured is in the form of a plate having smooth surfaces opposite to each other.

The fiber reinforced resinous material is compressed a plurality of times at a much lower pressure than that required in the practice of the conventional method until the fiber reinforced resinous material is compressed to the predetermined final degree of compression, which is preferably 70%. The extent to which the fiber reinforced resinous material is stepwisely compressed by the application of a single pressure and the number of times at which the compressive pressure is applied before the final degree of compression is attained, may be chosen according to the shape and the thickness of the eventually shaped article. However, the lower is the pressure which is applied at each step the less the material is fluidized, rendering it difficult to orient the reinforcement fibers. Accordingly, the pressure applied to the fiber reinforced resinous material for each application of the pressure is preferably within the range of $1/5$ to $1/100$ of the final degree of compression which is defined as the extent to which the fiber reinforced resinous material is desired to be compacted to provide an intended article of manufacture.

Preferably, where by pressing the semi-cured fiber reinforced resinous material several times the reinforcement fibers are controlled so as to be oriented in all directions for the purpose of producing the eventually shaped article having an isotropy in which the strength relative to the direction is uniform, the speed at which the fiber reinforced resinous material is relatively moved between the roll and/or the die which are disposed in a plurality of stages spaced a distance from each other in a direction of transport of the fiber reinforced resinous material may be uniform while all of the rolls employed have a uniform outer diameter.

Where by pressing the semi-cured fiber reinforced resinous material several times the reinforcement fibers are controlled so as to be oriented in one particular direction for the purpose of producing the eventually shaped article having an anisotropy in which the strength varies according to the direction, the rolls may be driven at different speeds so that the speed at which the fiber reinforced resinous material is relatively moved between the roll and/or the die which are disposed in a plurality of spaced stages may vary in the direction of transport thereof, or use may be made of rolls of varying outer diameters while the rolls are driven at equal speeds.

If at this time the speed of transport of the fiber reinforced resinous material at a region upstream with respect to the direction of transport thereof is chosen to be lower than that at a region downstream with respect to the direction of transport, the reinforcement fibers contained in the fiber reinforced resinous material can be forced to orient in a direction parallel to the direction of transport so that the strength in a direction parallel to the direction of transport can be advantageously increased. Conversely, if the speed of transport of the fiber reinforced resinous material at a region upstream with respect to the direction of transport thereof is chosen to be higher than that at a region downstream with respect to the direction of transport, the reinforcement fibers contained in the fiber reinforced resinous material can be forced to orient in a direction generally perpendicular to the direction of transport so that the strength in a direction perpendicular to the direction of transport can be advantageously increased.

The fiber reinforced resinous material employed in the practice of the present invention nevertheless contains a high temperature curing agent so that, while the shaping thereof by the application of low pressure between the die and the roll is carried out at normal temperature while in a semi-cured state, the fiber reinforced resinous material having been compressed can be cured at a high temperature. In other words, as one of features of the present invention, the shaping and the curing are separately, but sequentially, carried out.

According to another aspect of the present invention, the present invention provides a molding device which comprises a die; a roll opposed to the die; compressing means for pressing one of the die and the roll against the other of the die and the roll; and driving means for moving and/or rotating at least one of the die and the roll relative to the resinous material. In this construction, the fiber reinforced resinous material is shaped into a predetermined configuration by compressing a number of times the fiber reinforced resinous material delivered by the pressing means until the fiber reinforced resinous material is compacted to a predetermined degree of compression. After the fiber reinforced resinous material has been compacted, the fiber reinforced resinous material is delivered by the drive means in a direction outwardly of the molding device with no need to apply any drawing force, to thereby continuously shape the fiber reinforced resinous material to provide shaped articles.

Where the molding device is desired to be used for the continuous manufacture of eventually shaped articles, the roll and the die disposed in opposition to the roll may be disposed in a plurality of stages spaced in a direction parallel to the direction of transport of a web of fiber reinforced resinous material. In this system, the distance between the roll and the die of those stages may stepwisely decrease in a direction downstream with respect to the direction of transport of the fiber reinforced resinous material to enable the fiber reinforced resinous material to be pressed by the application of stepwisely varying pressures.

By adjusting the speed of movement and/or rotation of the roll and the die of each stage disposed along the path of transport of the fiber reinforced resinous material, and/or by varying the respective outer diameters of the rolls, the orientation of the reinforcement fibers can be controlled in an arbitrarily chosen particular direction as hereinbefore described so that the eventually formed article can have a strength having an anisotropy.

Conversely, if the constant speed of movement and/or rotation is chosen for the roll and the die of each stage, and by employing the rolls having uniform outer diameters, the reinforcement fibers can be controlled to lie in all directions so that the eventually formed article can have a strength having an isotropy.

Where the molding device of the present invention is designed to manufacture a shaped article, the device further comprises a curing means for curing the fiber reinforced resinous material during the passage thereof through the curing means, and the shaping means may further include a constricting means for avoiding any deformation of the fiber reinforced resinous material in a direction other than the direction in which the roll presses it.

The fiber reinforced resinous material utilizable in the molding device of the present invention may preferably be a sheet molding compound which is one kind of fiber reinforced plastic. Specifically, this sheet molding compound is a sheet of resinous compound prepared by impregnating a chopped strand mat with unsaturated polyester resin mixed with filler, thickener, a mold release agent and pigments, placing polyethylene sheets over opposite surfaces of the mat, and heating the covered mat at a temperature of about 40° C. to increase the viscosity of the resinous compound contained therein.

As hereinbefore described, according to the method of the present invention, before the final degree of compression is attained by the shaped article, the fiber reinforced resinous material is compacted several times. Therefore, not only can the material undergo minimized fluidization and undesirable uneven distribution of the material be avoided, but also the orientation of the reinforcement fiber can be controlled by varying the outer diameter of the roll and/or the amount of pressure applied at once to the fiber reinforced resinous material and/or by varying the speed of rotation of the roll or rolls.

By way of example, by controlling the speed of movement imparted by the roll and/or the die to the fiber reinforced resinous material, an undesirable orientation of the reinforcement fiber due to a flow thereof in a particular direction can be avoided to secure the isotropy of the physical strength while eliminating the orientation of the reinforcement fibers in such a direction as to result in a failure to attain the required strength. Alternatively, it is possible to provide the article with a relatively high strength in a particular direction and, by arbitrarily controlling the physical properties, the physical properties of the eventually formed article can be improved.

In addition, a continuous molding and shaping is possible with the use of the fiber reinforced resinous material utilizing the dry material. Yet, since an extrusion molding system is utilized, the required power to transport the fiber reinforced resinous material can be advantageously reduced as compared with that in the pultrusion system.

BRIEF DESCRIPTION OF THE DRAWINGS

This and other objects and features of the present invention will become readily understood from the following description of a preferred embodiments taken with reference to the accompanying drawings, in which:

FIG. 18 is an end view showing a shaped article made from the test piece shown in FIG. 17;

FIGS. 25(A) and 25(B) are schematic diagrams showing two compressing stages in the molding device of FIG. 21 and a web of sheet molding compound processed thereby, respectively;

FIGS. 26(A) and 26(B) are diagrams similar to Figs. 25(A) and 25(B), respectively, showing a modification of the sixth embodiment of the present invention; and FIG. 27 is a schematic sectional view of a curing unit which may be employed in the practice of the present invention.

DETAILED DESCRIPTION OF THE EMBODIMENT

Hereinafter, preferred embodiments of the present invention will be described in detail.

Figure 6:
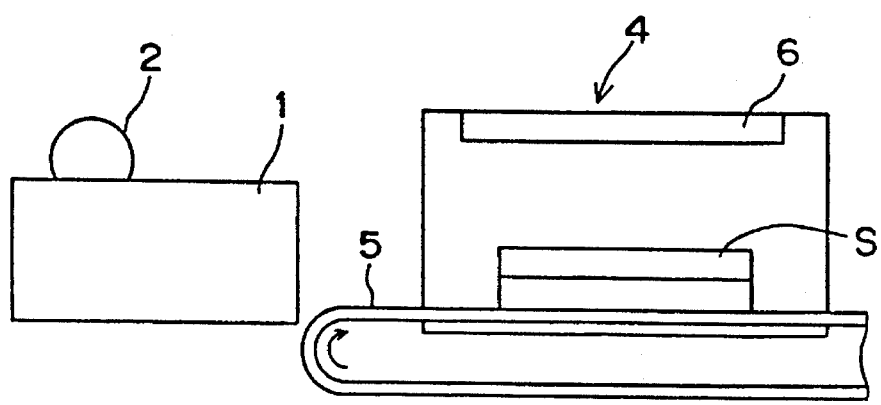
FIG. 6 is a schematic elevational view showing the molding device coupled with a curing unit.

Referring first to FIGS. 1 to 6, there is shown a molding method of and a molding device for forming a molded article of manufacture, for example, a generally rectangular ribbed plate, made of fiber reinforced resinous material according to a first preferred embodiment of the present invention. In these drawings, the molding device comprises a generally rectangular container-like stationary die 1 having a longitudinal axis and a cylindrical shaping roll 2 supported above the stationary die 1 for rotation about an axis of rotation lying perpendicular to the longitudinal axis of the stationary die 1 and also for movement in a direction parallel to the longitudinal axis of the stationary die 1. The illustrated molding device is used to mold a sheet molding compound (SMC) S to any desired shape, for example, a generally rectangular ribbed plate identified by 3 in FIG. 5 and is, as best shown in FIG. 6, operatively linked with a curing unit 4 which may comprise a heating device.

Figure 1:
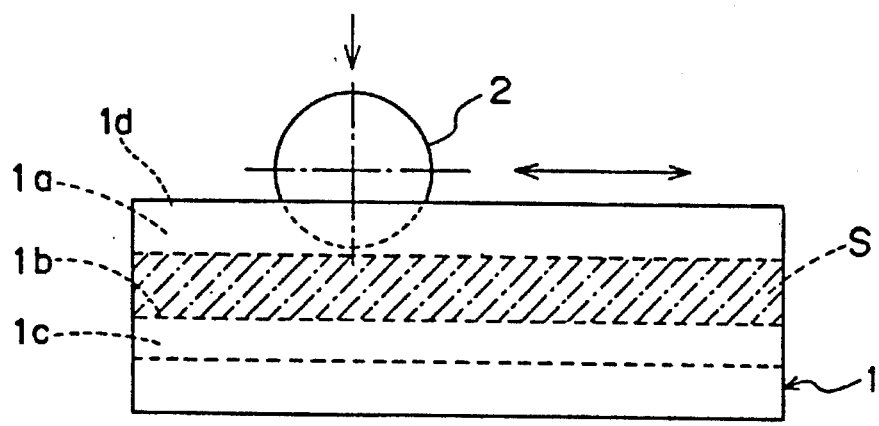
FIG. 1 is a schematic elevational view of a molding device according to a first preferred embodiment of the present invention.
Figure 2:
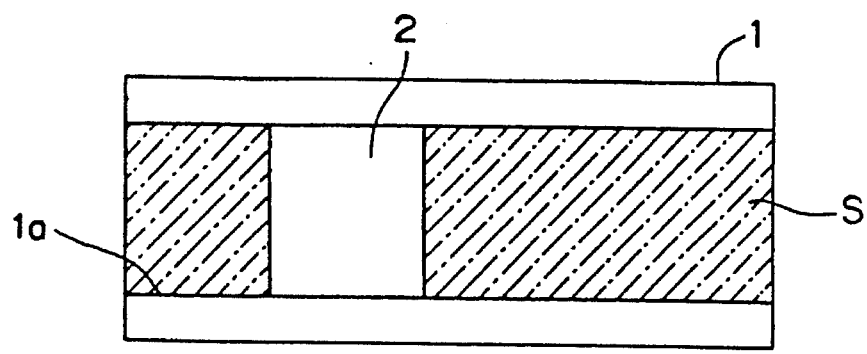
FIG. 2 is a top plan view of the molding device of FIG. 1.
Figure 3:
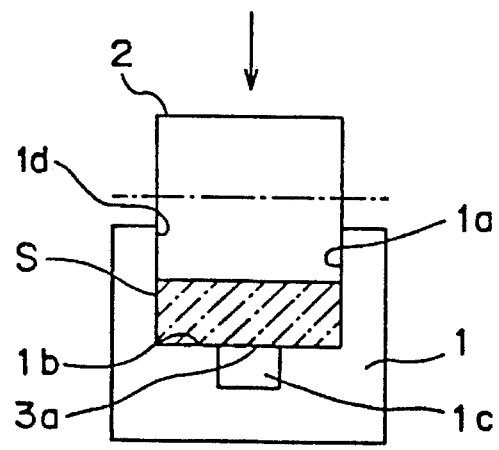
FIG. 3 is an end view of the molding device of FIG.

The molding unit comprising the stationary die 1 and the shaping roll 2 is so designed as to produce the rectangular ribbed plate 3 comprising a generally rectangular plate region 3c having one surface formed integrally with a longitudinal rib 3d that extends lengthwise of the plate region 3c and is positioned intermediate of the width thereof while representing a generally T-shaped sectional configuration. For this purpose, the stationary die 1 has a cavity 1a defined therein and opening upwardly through a top opening 1d and also has a bottom surface 1b formed with a rib-defining longitudinal recess 1c extending lengthwise of the stationary die 1 and positioned intermediate of the width thereof. The sheet molding compound S cut to have a shape substantially similar to the shape of the bottom surface 1c is placed inside the cavity 1a with a lower surface 3a thereof held in contact with the bottom surface 1b as shown in FIGS. 1 to 3. The shaping roll 2 is subsequently placed inside the cavity 1a of the stationary die 1 from above through the top opening 1d with its axis of rotation oriented perpendicular to the longitudinal axis of the stationary die 1. This shaping roll 2 is operatively coupled not only with a pressing means (not shown) positioned above the shaping roll 2 so that a pressing force can be transmitted to the sheet molding compound S within the stationary die 1 through the shaping roll 2, but also with a drive means (not shown) so that the shaping roll 2 while pressing the sheet molding compound S within the stationary die 1 can undergo a rotary motion about the axis of rotation thereof and, at the same time, a reciprocating motion in a direction parallel to the longitudinal axis of the stationary mold as indicated by the double arrow-headed line.

When the sheet molding compound S is molded in the molding unit of the above described construction, the shaping roll 2 is, while rotated about the axis of rotation thereof and moved in the direction lengthwise of the stationary die 1, lowered stepwise so that, after a desired or required number of passes of the shaping roll 2 from one end of the stationary die 1 to the other, the sheet molding compound S within the stationary die 1 can be compacted to achieve a final degree of compression. In this connection, it is to be noted that a single pass of the shaping roll 2 relative to the stationary die 1, during which the shaping roll 2 is simultaneously rotated and moved relative to the stationary die 1, means a single movement of the shaping roll 2 from one of the opposite ends of the stationary die 1 to the other and each double passes corresponds therefore to a single reciprocation of the shaping roll between the opposite ends of the stationary die 1. It is also to be noted that the final degree of compression referred to above and hereinafter and designated R is to be understood as meaning the ratio of the difference between the initial thickness to of the sheet molding compound S before being compacted and the thickness t thereof after having been compacted relative to the initial thickness to, that is, $R = (t_o - t)/t_o$. According to the embodiment now under discussion, the thickness t of the sheet molding compound S after having been compacted corresponds to the thickness of the plate region 3c of the resultant ribbed plate 3.

Thus, each time the shaping roll 2 completes a single pass, the pressure applied from the shaping roll 2 to the sheet molding compound S within the stationary die 1 is lowered towards the stationary die 1 a predetermined small distance which may be of a value required for the sheet molding compound S to be compacted by a quantity corresponding to $1/5$ to $1/100$ of the final degree R of compression. The required number of passes of the shaping roll 2 relative to the stationary die 1 can be determined once the final degree R of compression has been determined, that is, the extent to which the sheet molding compound S is desired to be compacted, to provide an intended article of manufacture.

Figure 4:
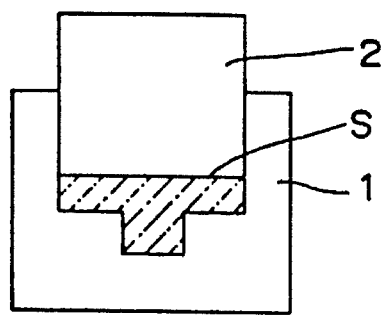
FIG. 4 is a view similar to FIG. 3 showing the molding device after a final degree of compression has been accomplished.
Figure 5:
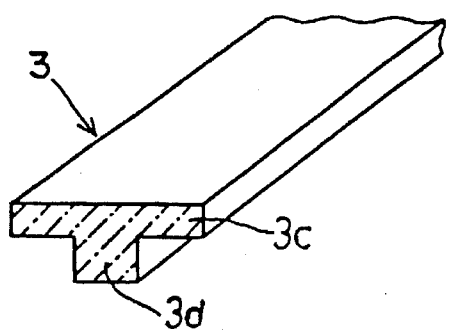
FIG. 5 is a fragmentary perspective view of a shaped article of manufacture made by the molding device of FIG. 1.

As the number of passes of the shaping roll 2 relative to the stationary die 1 increases, a portion of the lower surface 8a of the sheet molding compound S which confronts the rib-defining recess 1c within the stationary die 1 is forced to progressively flow into the rib-defining recess 1c with the thickness of the remaining portion of the sheet molding compound S decreasing. When the shaping roll 2 has been passed the required number of times over the sheet molding compound S within the stationary die 1, not only is the rib-defining recess 1c completely filled up, but also the sheet molding compound S assumes a generally T-shaped cross-section as shown in FIG. 4.

The shaping of the sheet molding compound S performed by the shaping roll 2 in cooperation with the stationary die 1 is carried out at room temperatures while the sheet molding compound S is in a semi-cured or substantially semi-cured state. After the molding of the sheet molding compound S, that is, after the shaping roll 2 has been passed a required number of times over the sheet molding compound S within the stationary die 1, the stationary die 1 accommodating therein the compacted sheet molding compound S is transported by any suitable transport means, for example, a conveyor 5, to the curing unit 4. During the passage of the stationary die 1 through the curing unit 4, the sheet molding compound S as molded within the stationary die 1 is heated to a temperature within the range of 80° to 150° for a predetermined time by a heating means 6, which may be a heater or a hot air blower, so that the sheet molding compound S containing a high temperature curing agent can be cured completely. After the curing within the curing unit 4, the stationary die 1 having the cured sheet molding compound S is removed out of the curing unit, followed by a removal of the cured sheet molding compound S from the stationary die 1 to thereby complete the generally rectangular ribbed plate 8 shown in FIG. 5.

Figure 7:
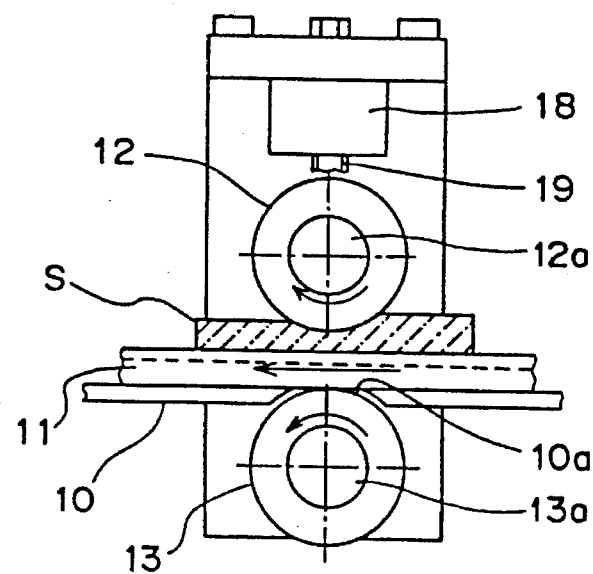
FIG. 7 is an elevational view of the molding device according to a second preferred embodiment of the present invention.
Figure 8:
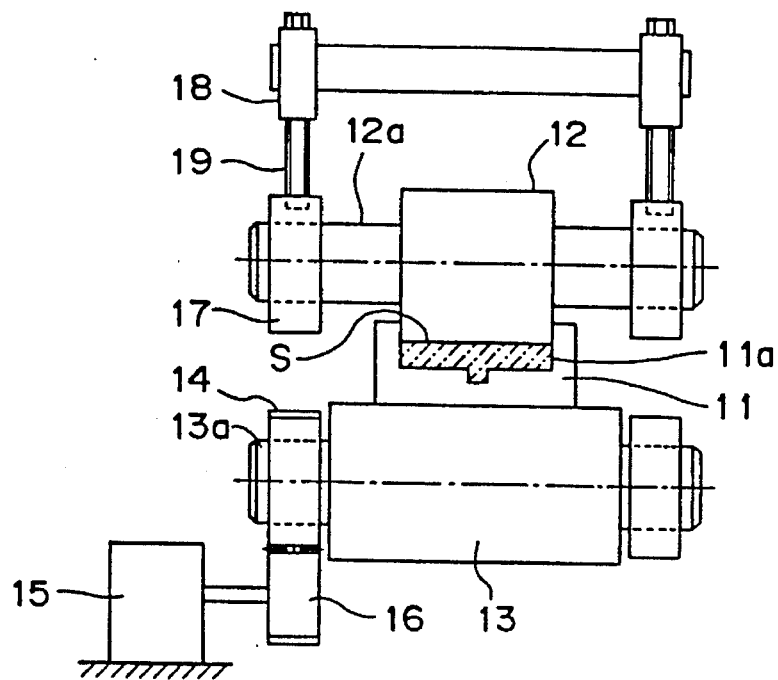
FIG. 8 is a sectional view of the molding device of FIG. 7.

While the molding method and the molding device shown in and described with reference to FIGS. 1 to 6 are suited for a batch operation, a molding device which is shown in and will now be described with reference to FIGS. 7 and 8 is suited for a continuous molding of the sheet molding compound. Referring now to FIGS. 7 and 8 showing a second preferred embodiment of the present invention, the molding device shown therein is designed to receive a continuous web of sheet molding compound S from, for example, a roll of sheet molding compound and to mold it continuously to provide a ribbed strip which may, when cut, eventually provide a number of generally rectangular ribbed plates, each similar to that shown in and described with reference to FIG. 5.

The molding device shown in FIGS. 7 and 8 comprises a mold support table 10 on which a movable die 11 having a cross-sectional representation identical or similar to that of the stationary die 1 employed in the foregoing embodiment of the present invention is placed for movement along the support table 10. The molding device shown therein also comprises upper or shaping and lower rolls 12 and 13 positioned one above the other on respective sides of the support table 10, the rolls 12 and 13 constituting a shaping unit by which the sheet molding compound S within the movable die 11 can be progressively pressed and be transported together with the movable die 11 in a direction downstream of the movable die 11.

More specifically, the lower roll 13 positioned generally beneath the support table 10 has a pair of stud shafts 13a coaxially protruding outwardly therefrom and rotatable together with the lower roll 13. One of the stud shafts 13a has a driven gear 14 which is meshed with a drive gear 16 rigidly mounted on a drive shaft of a drive unit, for example, an electric motor 15, so that the lower roll 13 can be driven by the motor 15 in a counterclockwise direction as viewed in FIG. 7 and as shown by the arrow. The support table 10 has a window 10a defined therein at a location immediately above the lower roll 13 to allow the lower roll 13 to partially protrude therethrough to contact an undersurface of the movable die 11. Therefore, during the rotation of the lower roll 13 in the counterclockwise direction, the movable die 11 can be moved in a direction conforming to the direction of rotation of the lower roll 13.

The upper or shaping roll 12 rotatably supported immediately above the lower roll 13 is rotatably mounted on a drive shaft 12a so as to partially protrude into the cavity 11a of the movable die 11 to press the web of sheet molding compound within the movable die 11. Each time the movable die 11 accommodating therein the sheet molding compound S undergoes a single pass movement relative to the shaping unit comprised of the upper and lower rolls 12 and 13, the upper roll 12 is lowered towards the movable die 11 a predetermined small distance which may be of a value required for the sheet molding compound S to be compacted by a quantity corresponding to $\frac{1}{5}$ to $\frac{1}{1000}$ of the final degree R of compression. The lowering of the upper roll 12 towards the movable die 11 can be accomplished by means of a feed screw mechanism 18 that includes at least one actuating rod 19 having a lower end operatively coupled with an associated bearing 17 rotatably supporting one end of the drive shaft 12a. Thus, it will readily be understood that, by adjusting the feed screw mechanism 18, the upper roll 12 can be lowered by the predetermined distance each time the movable die 11 undergoes a single pass movement.

Although not shown, a curing unit (not shown) is arranged along the path of transport of the movable die 11 and at a location downstream of the support table 10 with respect to the direction of transport of the movable mold 11, which is effected after the required number of passes of the movable die 11 relative to the shaping unit has been accomplished, so that the web of sheet molding compound material S as molded within the movable die 11 can be heated to cure.

It is to be noted that, in place of the feed screw mechanism 18 referred to above, an air cylinder may be employed for stepwise lowering the upper roll 12 towards the movable die 11.

According to the second preferred embodiment of the present invention, the web of sheet molding compound S placed inside the cavity 11a of the movable die 11 can be reciprocably moved beneath the upper roll 12 together with the movable die 11 during the rotation of the lower roll 13 and is, at the same time, compacted by the upper roll 12. At this time, the web of sheet molding compound S within the movable die 11 receives a relatively small pressing force for each pass of the movable die 11 relative to the upper roll 12 and is compacted stepwise as the movable die 11 undergoes the required number of passes relative to the upper roll 12. Since the upper roll 12 is lowered by the predetermined distance each time the movable die 11 completes a single pass relative to the upper roll 12, not only is a highly precise compacting of the web of sheet molding compound S possible within the movable die 11, but also any possible adverse influence which a reactive force from the web of sheet molding compound may brine about on the precise shaping thereof can be advantageously avoided.

As is the case with the foregoing embodiment, after the required number of passes has been completed, the web of sheet molding compound S having been compacted to achieve the final degree R of compression is transported through the curing means together with the movable die 11 for the heat treatment to cure it. Thereafter, the web of sheet molding compound is removed out of the movable die 11 and is then cut to provide a number of generally rectangular ribbed plates 3 shown in FIG. 5.

Figure 9:
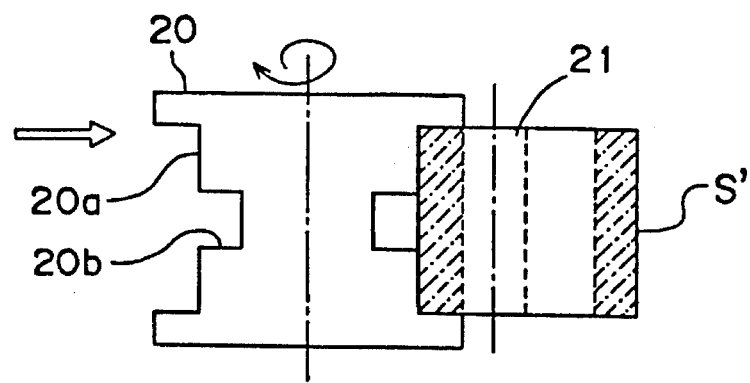
FIG. 9 is a schematic elevational view of the molding device according to a third preferred embodiment of the present invention.
Figure 10:
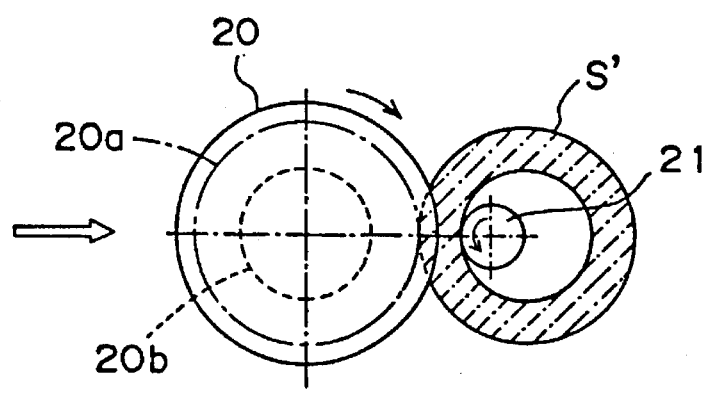
FIG. 10 is a side view of the molding device of FIG.
Figure 11:
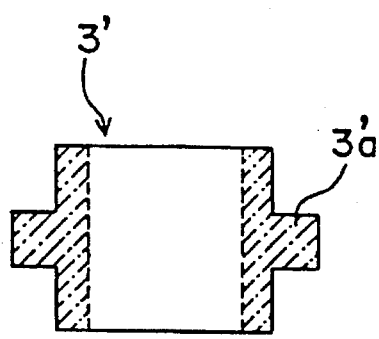
FIG. 11 is a sectional view showing a shaped article made by the molding device of FIG. 9.

Figs. 9, 10 and 11 illustrate a third preferred embodiment of the present invention wherein the molding device is designed to shape the sheet molding compound material S of a tubular shape into a generally radially ribbed tubular member 3' comprising, as best shown in FIG. 11, a tubular body having a radially outwardly protruding annular rib 3'a positioned intermediate of the length of the tubular body. For this purpose, the molding device comprises a generally cylindrical shaping roll 20 supported for rotation about an axis of rotation and having an outer peripheral surface formed with a radially inwardly depressed annular cavity 20a, the bottom of the annular cavity 20a being radially inwardly grooved to define a rib-defining annular recess 20b that is positioned intermediate the width of the annular cavity 20a. This shaping roll 20 is urged rightward as viewed in FIGS. 9 and 10 and as shown by the arrow by means of a pressing means (not shown) and is drivingly coupled with a drive means (not shown) so as to be driven about the axis of rotation thereof. Positioned on one side of and radially outwardly of the shaping roll 20 is a counter roll 21 supported for rotation about its own axis of rotation while being urged towards the shaping roll 20 by means of the pressing means referred to above.

According to the third preferred embodiment of the present invention, the tubular sheet molding compound S' is placed between the shaping roll 20 and the counter roll 21 with a wall portion thereof received within the cavity 20a as best shown in FIG. 10. Starting from this condition as shown in FIG. 10, the shaping roll 20 is driven in one direction about the axis of rotation thereof while being urged towards the counter roll 21 to successively compress that wall portion of the tubular sheet molding compound S'. At this time, the tubular sheet molding compound S' is rotated about the longitudinal axis thereof with its wall portion sandwiched between the shaping roll 20 and the counter roll 21 and, each time the tubular sheet molding compound S' completes a 360 rotation, the shaping roll 20 is moved towards the counter roll 21 a predetermined small distance which may be of a value required for the wall portion of the tubular sheet molding compound S' to be compacted radially inwardly by a quantity corresponding to $\frac{1}{5}$ to $\frac{1}{1000}$ of the final degree R of compression, and at the same time, the direction of rotation of the shaping roll 20 is reversed. Repeated clockwise and counterclockwise rotations of the shaping roll 20 allows a portion of an outer peripheral surface of the tubular sheet molding compound S', which confronts the annular recess 20b to progressively flow into the annular recess 20b to eventually form the annular rib 3'a as shown in FIG. 11. It is to be noted that each complete rotation of the tubular sheet molding compound S' in one of the opposite directions effected in the manner hereinabove described corresponds to a single pass as used in connection with any one of the first and second embodiments of the present invention.

Thus, it will readily be seen that, each time the tubular sheet molding compound S' undergoes one complete rotation, the wall portion of the tubular sheet molding compound S' is radially inwardly compacted or compressed by the quantity corresponding to $\frac{1}{5}$ to $\frac{1}{1000}$ of the final degree R of compression and that the required number of passes of the tubular sheet molding compound S' relative to the shaping roll 20 can be accomplished by repeatedly driving the shaping roll 20 clockwise and counterclockwise as viewed in FIG. 10. By so doing, the wall portion of the tubular sheet molding compound S' can be compacted to achieve the final degree R of compression to thereby provide the radially ribbed tubular member 3' shown in FIG. 11.

As is the case with any one of the foregoing embodiments of the present invention, the shaping of the tubular sheet molding compound S' is carried out at normal temperatures while it is in a semi-cured or substantially semi-cured state and, after the shaping, the tubular sheet molding compound S' is heat-treated to cure.

Figure 12:
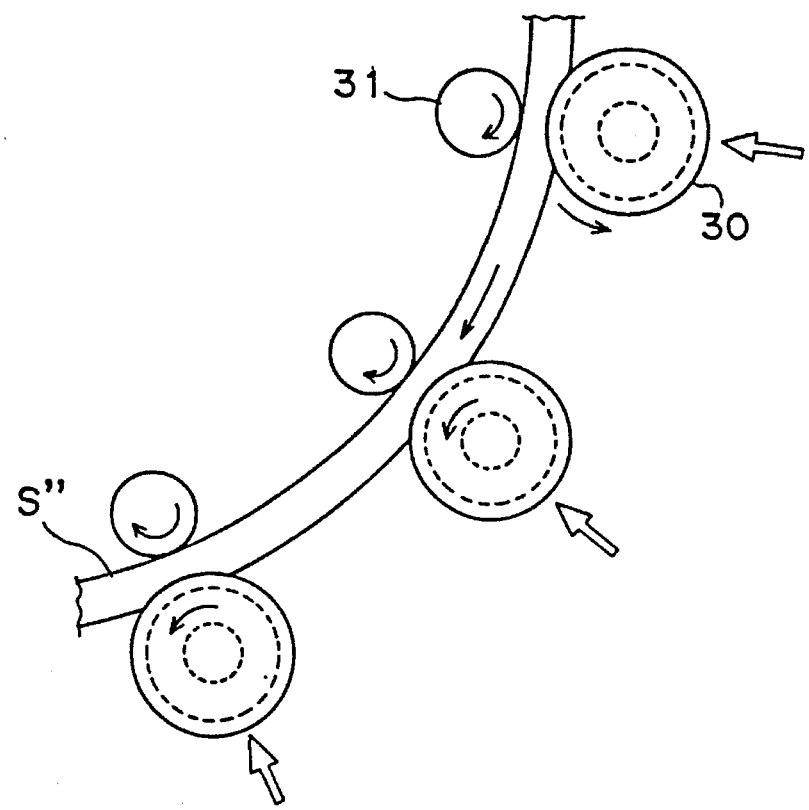
FIG. 12 is a schematic diagram showing the molding device according to a fourth preferred embodiment of the present invention.
Figure 13:
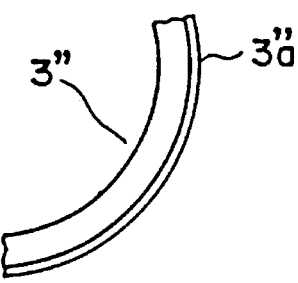
Figure 14:
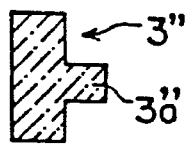
FIG. 14 is a sectional view of the shaped article of FIG. 13.

FIGS. 12 to 14 illustrates the molding device according to a fourth preferred embodiment of the present invention. The molding device shown therein is designed to receive a continuous web of sheet molding compound material S" of generally rectangular cross-sectional shape to shape it to provide, as best shown in FIGS. 13 and 14, a curved ribbed member 3" comprising a curved strip having outwardly and inwardly curved surfaces opposite to each other and also having the outwardly curved surface formed integrally with a correspondingly curved rib 3"a that protrudes outwardly therefrom and is positioned intermediate the width of the curved strip.

According to the fourth embodiment of the present invention, the molding device has a curved transport path and comprises a plurality of shaping units disposed along the curved transport path and spaced a predetermined distance from each other in a direction generally parallel to the transport path. Each of the shaping units comprises a pair of shaping and counter rolls 30 and 31 positioned on respective sides of the transport path and adapted to be driven in respective directions counter to each other as shown by the associated arrows. Each of the shaping rolls 30 used in the practice of the fourth embodiment of the present invention is of a construction identical with or similar to the shaping roll 20 employed in the molding device according to the third embodiment of the present invention shown in FIGS. 9 to 11 and is drivingly coupled with a common or separate drive means (not shown).

The shaping rolls 30 are urged a different distance towards the associated counter rolls 31 by means of respective pressing means (not shown) so that, during the transport of the web of sheet molding compound S' along the curved transport path in a direction shown by the arrow, the web of sheet molding compound S" can be successively compacted or compressed inwardly. More specifically, the shaping and counter rolls 30 and 31 of one of the shaping units which is positioned most upstream of the curved transport passage with respect to the direction of transport of the web of sheet molding compound S" are spaced from each other an initial distance which is greater than the final distance between the shaping and counter rolls 30 and 31 of one of the shaping units which is positioned most downstream of the curved transport passage while the distance between the shaping and counter rolls 30 and 31 of any one of the shaping units which is positioned intermediate between the upstream and downstream shaping means lies between the initial and final distances referred to above.

Thus, it will readily be understood that, as the web of sheet molding compound S" emerges outwardly from one of the shaping units which is positioned most downstream of the curved transport path, the web of sheet molding compound has been inwardly compacted or compressed to achieve the final degree R of compression. The web of sheet molding compound S' is subsequently heat-treated to cure to thereby complete the manufacture of the curved ribbed member shown in FIGS. 13 and 14.

Figure 15:
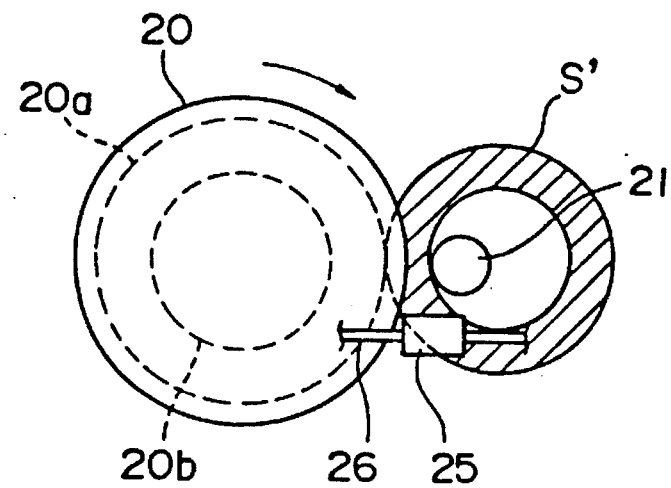
FIG. 15 is a schematic side view of the molding device according to a fifth preferred embodiment of the present invention.
Figure 16:
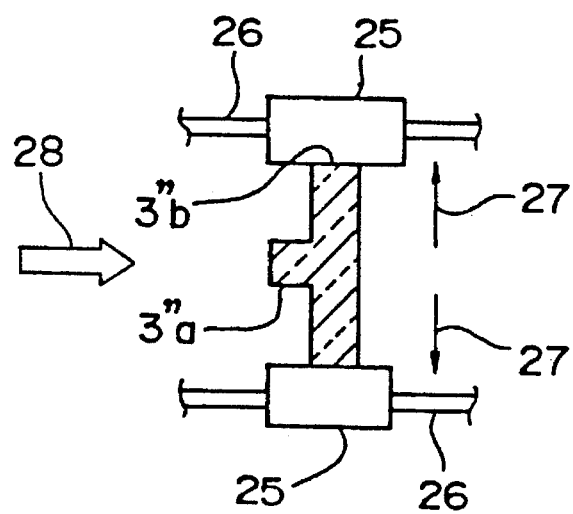
FIG. 16 is a schematic top plan view of the molding device of FIG. 15.

With reference to FIGS. 15 and 16, a fifth preferred embodiment of the present invention will now be described. The molding device shown therein is of a construction similar to that shown in and described with reference to FIGS. 9 and 10 and is designed to produce the radially ribbed tubular member 3' shown in and described with reference to FIG. 11. However, the molding device shown in FIGS. 15 and 16 differs from that shown in FIGS. 9 and 10 in that a pair of constricting rolls 25 are employed on respective sides of a nipping region between the shaping roll 20 and the counter roll 21. The constricting rolls 25 are rotatably mounted on respective support shafts 26 extending generally perpendicular to the axis of rotation of any one of the shaping roll 20 and the counter roll 21 and are so positioned as to be held in contact with respective annular end faces 8"b of the tubular sheet molding compound material S' during the shaping operation to avoid any possible lateral deformation of the tubular sheet molding compound S' in a direction perpendicular to the direction in which the wall portion thereof is compacted inwardly According to the fifth embodiment of the present invention, during the rotation of the tubular sheet molding compound S' with its wall portion successively passing across the nipping region between the shaping roll 20 and the counter roll 21 while being inwardly compressed, the opposite end portions of the tubular sheet molding compound S' tend to expand or flow laterally outwardly therefrom in a direction generally perpendicular to the direction of compression of the wall portion thereof. However, the constricting rolls 25 apply pressing forces to the respective opposite end faces 3"b of the tubular sheet molding compound S' in a direction perpendicular to the direction of compression to thereby suppress any possible lateral outward expansion of the end portions of the tubular sheet molding compound S' while permitting a portion of the tubular sheet molding compound S' intermediate its opposite ends to fill up the rib-defining recess 20b substantially completely.

It is to be noted that the pair of the constricting rolls 25 shown in and described with reference to FIGS. 15 and 16 may be equally employed for each shaping unit of the fourth embodiment shown in and described with reference to FIGS. 12 to 14.

In the practice of any one of the first to fifth embodiments of the present invention, the shaping roll 2, 12, 20 or 30 is drivingly coupled with the associated drive unit so that it can be driven at a constant speed while the sheet molding compound is transported also at a constant speed. Hereinafter, each of the foregoing embodiments of the present invention in which the shaping roll is driven at the constant speed with the sheet molding compound transported at the constant speed will be demonstrated by way of results of experiments.

Figure 17:
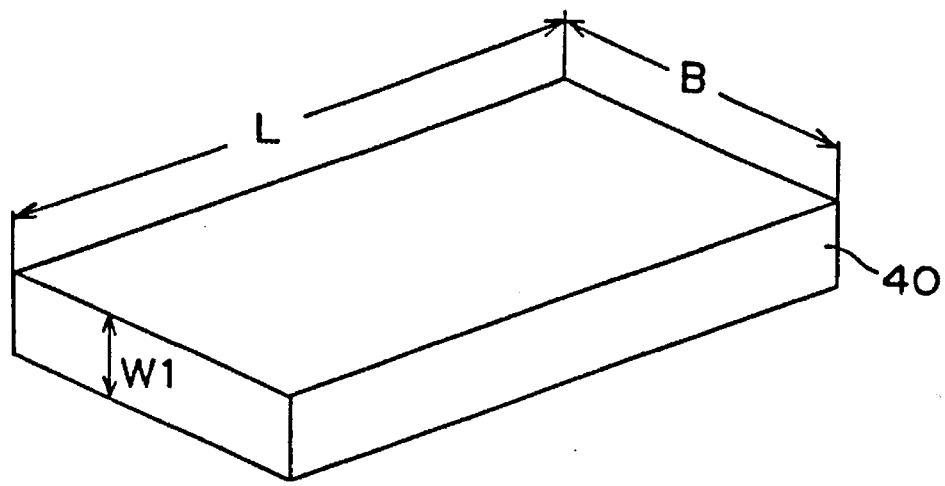
FIG. 17 is a perspective view showing a rectangular test piece used during experiments.
Figure 18:
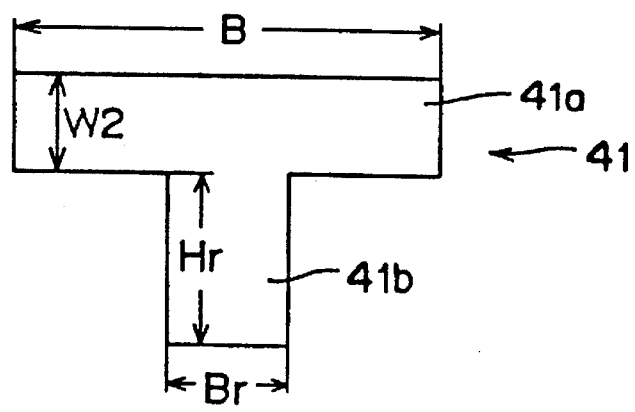
FIG. 18 is a fragmentary diagram showing the shaped article made by the molding device of FIG. 18.

Using the molding device according to the second embodiment of the present invention (FIGS. 7 and 8), a generally rectangular test piece 40, which is shown in FIG. 17 and made of sheet molding compound and has of a size of 300 mm in length L, 50 mm in width B and 10 mm in thickness W1, was molded and shaped to provide such a rectangular ribbed plate 41 of generally T-shaped cross-section as shown in FIG. 18 which was subsequently tested as to the density and the bending stress. The resultant rectangular ribbed plate 41 comprises a rectangular plate region 41a, 3 mm or 5 mm in thickness W2, having one surface formed with a longitudinal rib 41b of 10 mm in width Br and 8 mm in height Hr.

The test piece 40 was of a composition containing 14.3 wt % of unsaturated polyester resin, 51.4 wt % of calcium carbonate, 20 wt % of glass fibers and 14.4 wt % of various additives including a solution of thermoplastic resin, a curing agent (tertiary butyl peroxy benzoate), a viscosity bodying agent and an inner mold releasing agent. Each of the glass fibers used had a fiber length of 1 inch.

In shaping the testpiece 40, a final degree R of compression of 0.50 and 0.70 was employed. As regards the distance E over which the shaping roll is moved towards the mold for each pass, E=0.25 mm and E=0.50 mm were employed. Also, as regards the outer diameter D of the shaping roll, D=60 mm and D=120 mm were employed.

As indicated hereinbefore, the final degree R of compression is defined as meaning the ratio of the difference between the initial thickness of the sheet molding compound S before being compacted and the thickness t thereof after having been compacted relative to the initial thickness, that is, R=(to–t)/to.

The number of times over which the shaping roll was stepwisely moved the distance E of 0.25 mm was 28 in the case of the thickness W2 being 3 mm and 20 in the case of the thickness W2 being 5 mm, and the number of times over which the shaping roll was stepwisely moved the distance E of 0.50 mm was 14 in the case of W2=3 mm and 10 in the case of W2=5 mm.

The strength test conducted was a three-point bending test performed on the plate region of the resultant ribbed plate in the lengthwise direction thereof according to the method stipulated in JIS (Japanese Industrial Standards) K7055.

In the first place, measurements were conducted to determine how the final degree R of compression of the shaping roll affects the density and the strength. In other words, an average density and a maximum value of bending stress of the shaped articles shaped by the use of the shaping roll of 60 mm in outer diameter were measured after of the shaping roll was moved the predetermined distance for each pass, results of those measurements being shown in FIG. 19. As the graph of FIG. 19 makes clear, the employment of E=0.50 mm and E=0.25 mm resulted in the shaped article compacted to achieve R=0.70 showing a higher density than that compacted to achieve R=0.50. This means that the greater the distance of stepwise movement of the shaping roll for each pass, the higher the density of the shaped article and, therefore, a shaped article having an excellent internal condition can be obtained. However, when the final degree R of compression exceeds 0.70, peeling, laminar separation and undulation occur simultaneously during the shaping process to such an extent as to result in a difficulty in accomplishing further shaping.

On the other hand, similar test results have been obtained in connection with the maximum bending stress. Specifically, the employment of E=0.50 mm and E=0.25 mm resulted in the shaped article compacted to achieve R=0.70 showing a higher maximum bending stress than that compacted to achieve R=0.50. This appears to suggest that an increase of the density has resulted in an increase of the maximum bending stress. Thus, from the foregoing results of tests, a choice of the final degree R of compression of R=0.70, that is, 75% compression, appears to be recommendable.

Figure 19:
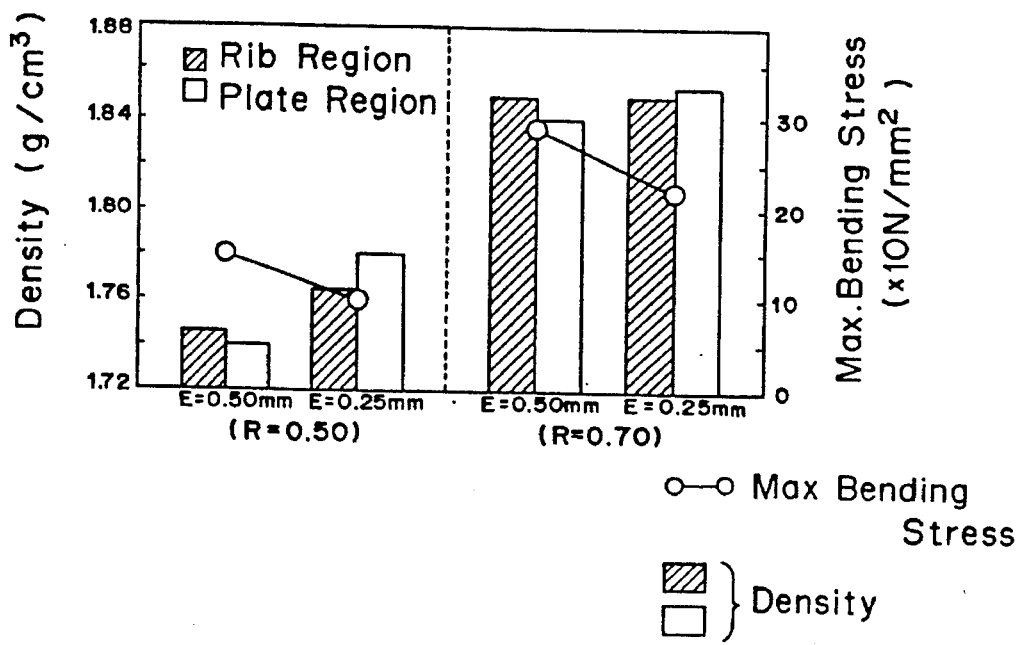
FIGS. 19 and 20 are graphs showing results of the experiments conducted with the test piece of FIG. 17.

The graph of FIG. 19 suggests that, even when the distance E of stepwise movement of the shaping roll is changed to 0.50 mm and 0.25 mm, the density of the resultant shaped article may be little affected. However, the choice of the relatively large distance E of 0.50 mm can result in a considerable increase in the maximum bending stress exhibited by the plate region of the shaped article.

Figure 20:
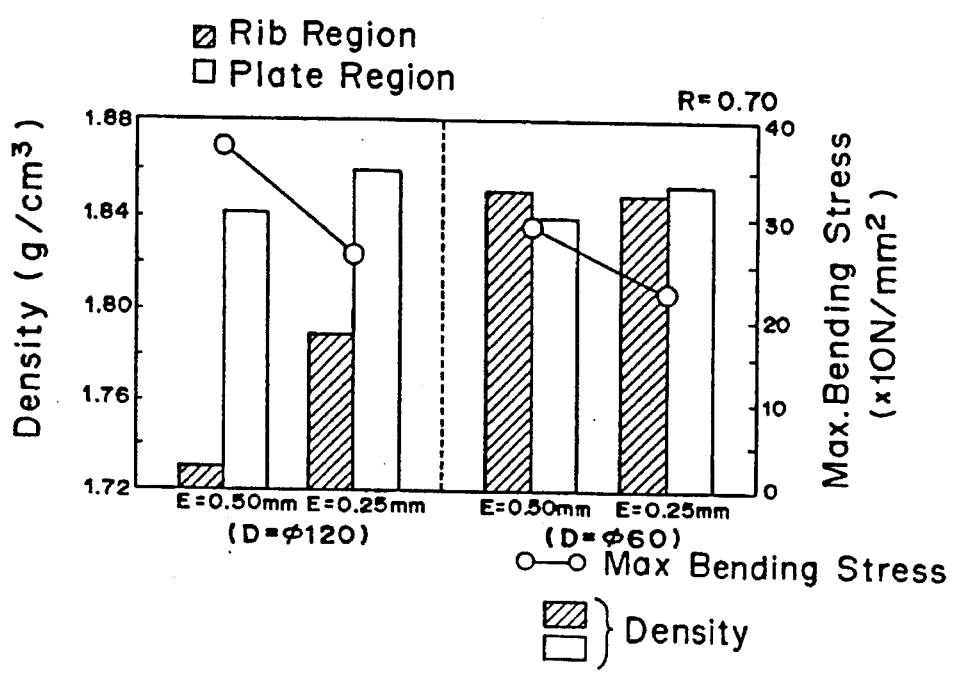

Also, the density and the maximum bending stress were tested for the shaped article molded and shaped with the use of the shaping roll of 60 mm and 120 mm in outer diameter D, results of which are shown in the graph of FIG. 20. As the graph of FIG. 20 makes clear, the greater the outer diameter of the shaping roll, the greater the density in the plate region is relative to that in the rib region. Conversely, the smaller the outer diameter of the shaping roll, the lower the density in the plate region is relative to that in the rib region. This means that a difference in processing speed allows the material to fluidize in a direction, conforming to the direction in which the rib region protrudes from the plate region, if the shaping roll has a relatively small outer diameter. Similarly, the maximum bending stress exhibited by the plate region gives a higher value when the shaping roll has a relatively small outer diameter than when it has a relatively great outer diameter.

The foregoing test results show that the employment of the relatively large distance E for each pass, that is, the relatively large extent to which the sheet molding compound is compressed inwardly for each pass, and the shaping roll of a relatively great outer diameter allows the material to flow considerably in the lengthwise direction and also allows the glass fibers to be readily oriented two-dimensionally in a horizontal direction, and therefore, the bending strength of the plate region appears to be increased. Conversely, if the extent to which the material is compressed inwardly for each pass is relatively small and the shaping roll of a relatively small outer diameter is employed, the material tends to flow considerably in the direction conforming to the direction in which the rib region protrudes from the plate region, and therefore, the glass fibers will not be oriented two-dimensionally to such an extent as to result in a reduction in bending strength.

Again, from the foregoing test results, it has been found that, where a constant speed of rotation of the shaping roll is employed, the selection of both the extent to which the material is inwardly compressed per pass and the outer diameter of the shaping roll can result in a favorable control of the orientation of the fibers for providing the shaped article having a desired or intended strength. In other words, it has been confirmed that the shaped article having a relatively high strength in a required particular direction and also having an anisotropy can be manufactured according to the present invention. Conversely, it has also been confirmed that, by allowing the material to flow uniformly in the lengthwise direction and also in the direction conforming to the direction of protrusion of the rib region from the plate region, the orientation of the reinforcement fibers can be eliminated to enable the shaping of the shaped article having a uniform strength in all direction and also having an isotropy.

Referring now to FIGS. 21 to 26, there is shown a molding device according to a sixth preferred embodiment of the present invention. As hereinbefore described, according to each of the first to fifth embodiments of the present invention, arrangement has been made that the shaping roll or rolls are driven at constant speed to transport or rotate the sheet molding compound at the constant speed while the compressing pressure is applied thereto in stepwise fashion. According to those embodiments of the present invention, if the outer diameter of the shaping roll is fixed, it is possible to manufacture the shaped article having an isotropic strength without allowing the internal reinforcement fibers to be oriented in a particular direction, but rather to be oriented uniformly in all directions. Accordingly, where it is desired that the reinforcement fibers contained in the sheet molding compound are desired to be oriented in one particular direction, the use of the shaping roll of a different outer peripheral surface is effective to bias the reinforcement fibers so as to be oriented in one particular direction so that the resultant shaped article can have an anisotropic strength.

However, in the sixth embodiment of the present invention which will now be described, use has been made of a plurality of pairs of rolls of uniform outer diameter positioned one after another in a direction of transport of the sheet molding compound, but adapted to be driven at different speeds so that the reinforcement fibers can be biased in one particular direction to impart an anisotropic strength to the resultant shaped article.

Figure 21:
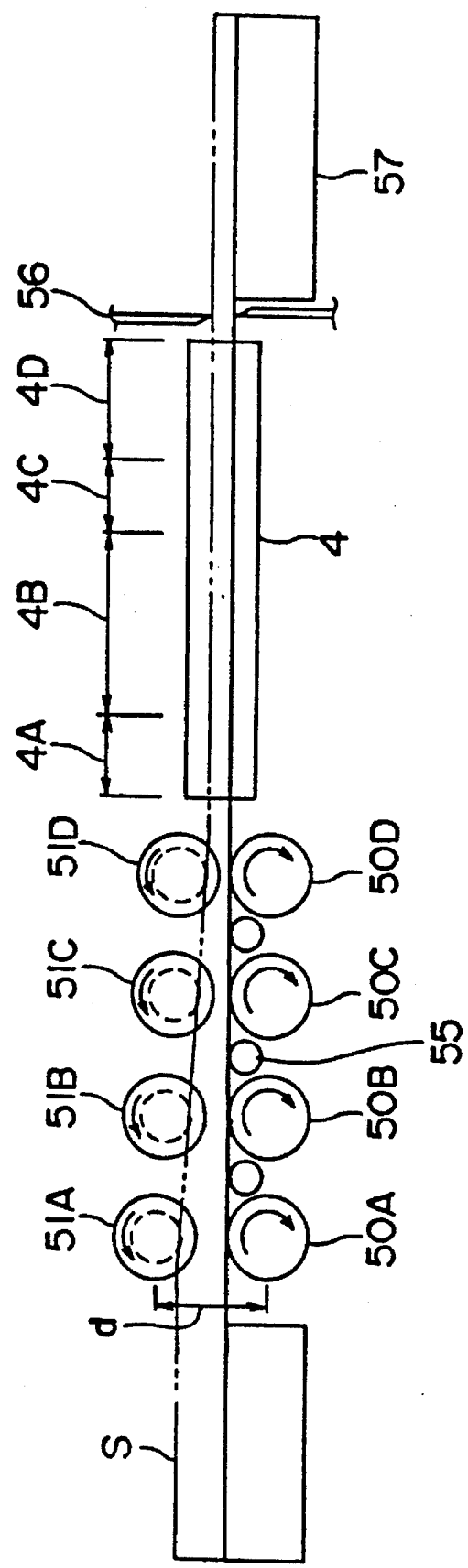
FIG. 21 is a schematic longitudinal side view of the molding device according to a sixth preferred embodiment of the present invention.

More specifically, as best shown in FIG. 21, the illustrated molding device comprises a plurality of, for example, first to fourth, compressing stages defined one after another along the transport path through which a web of sheet molding compound S' is transported, each of the compressing stages including a pair of shaping and counter rolls 50A and 51A, 50B and 51B, 50C and 51C, 50D and 51D, positioned one after on respective sides of the transport path.

The counter rolls 50A to 50D of the respective compressing stages are supported stationarily and are drivingly coupled with respective drive units (not shown) used to drive the counter rolls 50A to 50D at first to fourth different speeds, respectively, in a direction shown by the arrow so that the web of sheet molding compound S' can be transported at varying speeds from an upstream side adjacent the first compressing stage towards a downstream side adjacent the fourth compressing stage. The first speed at which the counter roll 50A of the first compressing stage is driven is chosen to be the lowest of all whereas the fourth speed at which the counter roll 50D of the fourth compressing stage is driven is chosen to be the highest of all, with the speeds stepwisely increasing from the first compressing stage to the fourth compressing stage.

Preferably, the respective speeds of rotation of the counter rolls 50A to 50D driven by the associated drive units are so selected that the web of sheet molding compound material S' can be transported from the upstream side towards the downstream side along the transport path at an average transport speed within the range of 0.5 to 2 meters per minute (5 meters per minute at a maximum average transport speed). It is, however, to be noted that, instead of the use of the separate drive units for the respective counter rolls 50A to 50D, a single drive unit may be employed in combination with a train of reduction gears designed to drive the counter rolls 50A to 50D at the respective first to fourth speeds.

Figure 22:
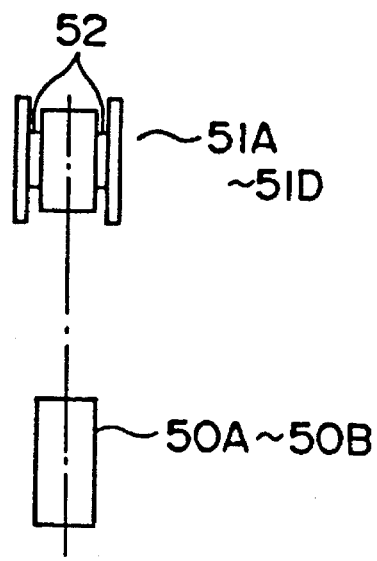
FIG. 22 is an elevational view showing a shaping roll and a counter roll used in the molding device of FIG.
Figure 23:
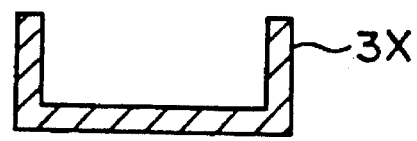
FIG. 23 is a sectional view showing a shaped article made by the molding device of FIG. 21.

Each of the shaping rolls 51A to 51D of the respective first to fourth compressing stages is of a construction comprising, as best shown in FIG. 22, a cylindrical body having an outer peripheral surface formed with a pair of annular grooves 52 defined adjacent the opposite ends thereof and is rotatably supported above the associated counter roll 50A to 50D. At the same time, each of the shaping rolls 51A to 51D is operatively coupled with a respective screw feed mechanism 18 shown in and described with reference to FIGS. 7 and 8 so that the minimum distance d between the shaping rolls 50A to 50D and the associated counter roll 51A to 51D, or the size of a respective nipping region defined therebetween, can be adjusted. In the practice of the sixth embodiment of the present invention, the distance d is chosen to be stepwisely decreased in order from the first compressing stage towards the fourth compressing stage while the difference in distance d between each neighboring pair of the shaping and counter rolls 50A and 51A, 50B and 51B, 50C and 51C, 50D and 51D is chosen to be within the range of 2 to 25 mm. Preferably, the difference in distance d between each neighboring pair of the rolls is chosen to be rather small and, where the difference in thickness between the sheet molding compound material and the resultant shaped article made of such sheet molding compound is large, the number of the compressing stages, that is, the number of the pairs of the shaping and counter rolls, may be increased.

So far illustrated, each of the shaping and counter rolls 51A to 51D and 50A to 50D has a uniform outer diameter of 200 mm, and use is made of a guide roll 55 of smaller outer diameter disposed and rotatably supported in position between each pair of neighboring counter rolls 50A to 50D for supporting from below the web of sheet molding compound material S being transported along the transport path.

The molding device of the above described construction according to the sixth embodiment of the present invention includes the curing unit 4, a cutting unit 56 and a delivery table 57 which are sequentially disposed downstream of the fourth compressing stage as shown in FIG. 21. Therefore, the web of sheet molding compound having successively been processed through the first to fourth compressing stages is transported into the curing unit 4, in which the compacted sheet molding compound is cured, and is, as it emerges outwardly from the curing unit 4, cut by the cutting unit 56 into shaped articles which are subsequently received on the delivery table 57. So far as the sixth embodiment of the present invention is concerned, each of the shaped articles referred to above is generally identified by $3x$ in FIG. 23 and has a generally U-shaped cross/section.

Figure 24:
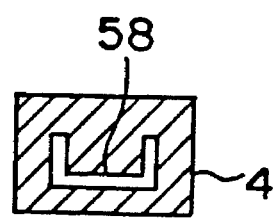
FIG. 24 is a sectional view showing a curing unit used in the molding device of FIG. 21.

With particular reference to FIG. 24, the curing unit 4 used in the practice of the sixth embodiment of the present invention has a guide passage 58 defined therein so as to extend completely across the curing unit 4 and having a generally U-shaped configuration complemental to the cross-sectional shape of the resultant shaped article $3x$. This curing unit 4 includes, as best shown in FIG. 21, a guide region 4A, a primary curing region 4B, a secondary curing region 4C and a final curing region 4D defined therein from an upstream end thereof towards a downstream end thereof. While each respective portion of the guide passage 58 in the curing unit 4 encompassed by the guide region 4A and the primary curing region 4B is somewhat oversized to provide a clearance between an outer perimeter of the compacted sheet molding compound being passed therethrough and a wall surface defining such portions of the guide passage 58, a portion of the guide passage 58 encompassed by the secondary curing region 4C is either somewhat oversized or somewhat undersized relative to the cross-sectional shape of the compacted sheet molding compound depending on thermal characteristics of the sheet molding compound. So far in the sixth embodiment of the present invention, the curing unit 4 has its interior heated to 150° C.

According to the sixth embodiment of the present invention, since the speed of rotation of one of the counter rolls 51A to 51D is chosen to be higher than the speed of rotation of any one of the counter rolls 51A to 51D which is positioned upstream of the one of the counter rolls with respect to the direction of transport of the web of sheet molding compound S, a tensile force acts on the sheet molding compound S in a downstream direction thereby allowing the internal reinforcement fibers F to be oriented in a direction conforming to the direction in which the tensile force acts, that is, in a horizontal direction, as shown in FIG. 25(B). Since the tensile force acts on the web of sheet molding compound S successively as the latter is successively transported through the nipping regions in the respective first to fourth compressing stages, the reinforcement fibers F contained in the web of sheet molding compound S can be substantially uniformly oriented horizontally.

After the web of sheet molding compound S has successively passed through the first to fourth compressing stages in the manner described above, the web of sheet molding compound S is transported through the curing unit 4 and is then cut by the cutting unit 56 into the resultant shaped articles each having a predetermined length.. During the passage of the web of sheet molding compound S through the second curing region 4C of the curing unit 4, a surface smoothness is imparted to an entire surface of the compacted web of sheet molding compound S. Each of the resultant shaped articles so manufactured in the manner described above has an anisotropy in which it has a higher strength in a direction conforming to the direction of orientation of the reinforcement fibers than in any other direction.

FIGS. 26(A) and 26(B) illustrate a modification of the sixth embodiment of the present invention. In this modification of FIGS. 26(A) and 26(B), the speed of rotation of one of the counter rolls 51A to 51D is chosen to be lower than the speed of rotation of any one of the counter rolls 51A to 51D which is positioned upstream of the one of the counter rolls with respect to the direction of transport of the web of sheet molding compound S. In other words, the first speed at which the counter roll 50A of the first compressing stage is driven is chosen to be the highest of all whereas the fourth speed at which the counter roll 50D of the fourth compressing stage is driven is chosen to be the lowest of all, with the speed stepwisely decreasing from the first compressing stage to the fourth compressing stage.

According to this modification, a portion of the web of sheet molding compound confined between the neighboring compressing stages can be compressed inwardly and, therefore, as shown in FIG. 26(B), the reinforcement fibers F contained in the web of sheet molding compound S can be oriented in a direction generally perpendicular to the direction in which the web S is transported. Since this action takes place on the web of sheet molding compound S successively as the latter is successively transported through the nipping regions in the respective first to fourth compressing stages, the reinforcement fibers F contained in the web of sheet molding compound S can be substantially uniformly oriented in the direction generally perpendicular to the direction of transport. Therefore, each resultant shaped article can have an anisotropy in which it has a relatively high strength in a direction generally perpendicular to the direction in which it has been transported.

The orientation of the reinforcement fibers contained in the web of sheet molding compound takes place progressively, not at one time, and, therefore, by suitably selecting the number of the compressing stages and/or the first to fourth speeds of rotation of the counter rolls 50A to 50D, the reinforcement fibers contained in the web of sheet molding compound can be oriented in both the horizontal direction as shown in FIG. 25(B) and the direction generally perpendicular to the direction of transport as shown in FIG. 26(B), that is, oriented in part in the horizontal direction and in part in the direction perpendicular to the direction of transport of the web S. Thus, the reinforcement fibers can be oriented in any particular direction or directions as desired, and the present invention is effective to produce the shaped articles having a relatively high strength in such particular direction or directions depending on the application of a shaped articles.

According to the present invention, the shaping unit may have any suitable construction and, at the same time, the curing unit may also have any suitable construction. By way of example, where it is desired to cure the tubular sheet molding compound material which has been compacted, the curing unit may be of a construction which comprises, as shown in FIG. 27, an inner circular row of generally elongated rolls 60 and an outer circular row of generally elongated rolls 61 positioned radially outwardly of the inner circular row of the rolls 61 in face-to-face relationship with the associated rolls 60. During the passage of the compacted web of sheet molding compound through the curing unit, the annular wall portion of the web is supported between the inner rolls 60 and the mating outer rolls 61 while heated by those rolls 60 and 61 which are heated to a predetermined temperature.

As hereinbefore described, the molding method and the molding device according to the present invention are effective to produce the shaped article of manufacture made of sheet molding compound (which may be a prepreg sheet) or thick molding compound (TMC) material, in which the orientation of the reinforcement fibers have been controlled with no possibility that they are oriented in any unexpected direction. Therefore, it is possible, for example, to provide the shaped article having an isotropy in which the reinforcement fibers are uniformly oriented in all directions and also to provide the shaped article having an anisotropy in which the reinforcement fibers are oriented in the required particular direction.

Since the orientation of the reinforcement fibers can be controlled so that the resultant shaped article can have a required strength, the shaped article can have favorable physical characteristics. Also, with a progressive increase of the extent to which the sheet molding compound is compressed inwardly, both of the density and the maximum bending stress of the resultant shaped article can be increased.

Also, since a continuous molding and shaping of the fiber reinforced resinous material is possible and no drawing force is necessary to draw the fiber reinforced resinous material during the continuous molding and shaping operation, but the fiber reinforced resinous material can be automatically delivered by the shaping unit, the power required to transport the fiber reinforced resinous material can be reduced considerably. The shape of the articles formed by the continuous molding and shaping operation may not be always limited to those discussed hereinbefore.

Specifically, since the molding method and the molding device according to the present invention are intended for use with the fiber reinforced resinous material which is made of dry material, as compared with the molding and shaping of wet material, will bring about substantially no environmental problem and are effective to precisely manufacture the shaped articles.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A molding apparatus for molding a resinous material, which is reinforced with reinforcement fibers and has a starting shape and thickness, into a fiber-reinforced resin article having a final shape and thickness, said apparatus comprising:

a shaping unit including a movable die having a flat die surface, and a counter roll spaced from said movable die at an initial distance;

driving means for rotating said counter roll at a variable speed and for providing a reciprocating movement of said movable die relative to said counter roll; and pressing means for stepwise moving said counter roll toward said movable die for stepwise decreasing the initial distance between said movable die and said counter roll, to thereby apply a stepwise increase in pressure to the resinous material contained in the movable die each time the resinous material is passed beneath said counter roll by the reciprocating movement of said movable die, until the final shape and thickness are attained in the resinous material.

2. The molding apparatus as claimed in claim 1, wherein said pressing means includes a screw feeder mechanism operatively connected with said counter roll.

3. The molding apparatus as claimed in claim 1, wherein said pressing means includes a pneumatic cylinder operatively connected with said counter roll.

4. The molding apparatus as claimed in claim 1, further comprising a curing means for curing the fiber-reinforced resin article, said curing means being mounted adjacent and downstream of said shaping unit with respect to a direction of transport along the transport path.

* * * * *